Feb. 21, 1961 C. C. HERITAGE 2,972,171
PRODUCTION OF WOOD FIBER
Filed Oct. 4, 1952 4 Sheets-Sheet 2
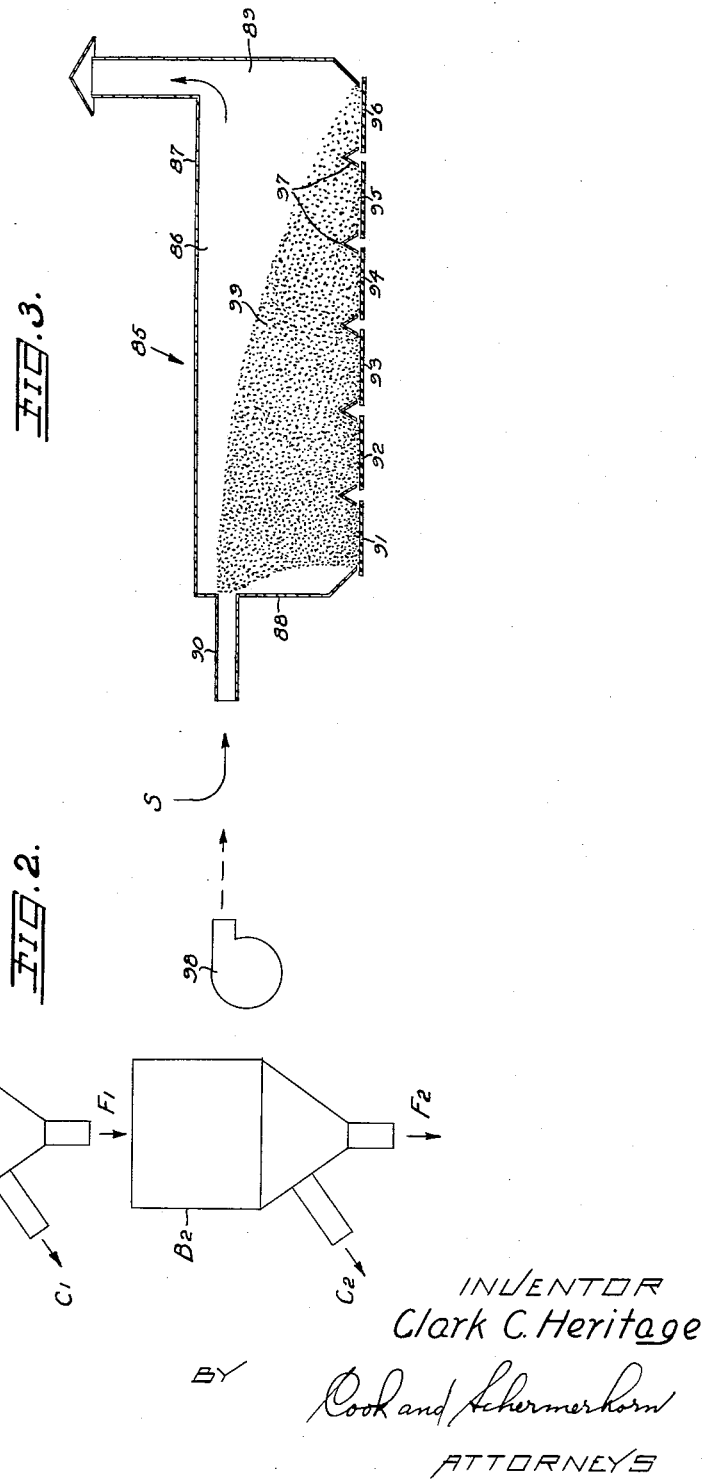
INVENTOR
Clark C. Heritage
BY
Cook and Schermerhorn
ATTORNEYS Feb. 21, 1961 C. C. HERITAGE 2,972,171
PRODUCTION OF WOOD FIBER
Filed Oct. 4, 1952 4 Sheets-Sheet 3

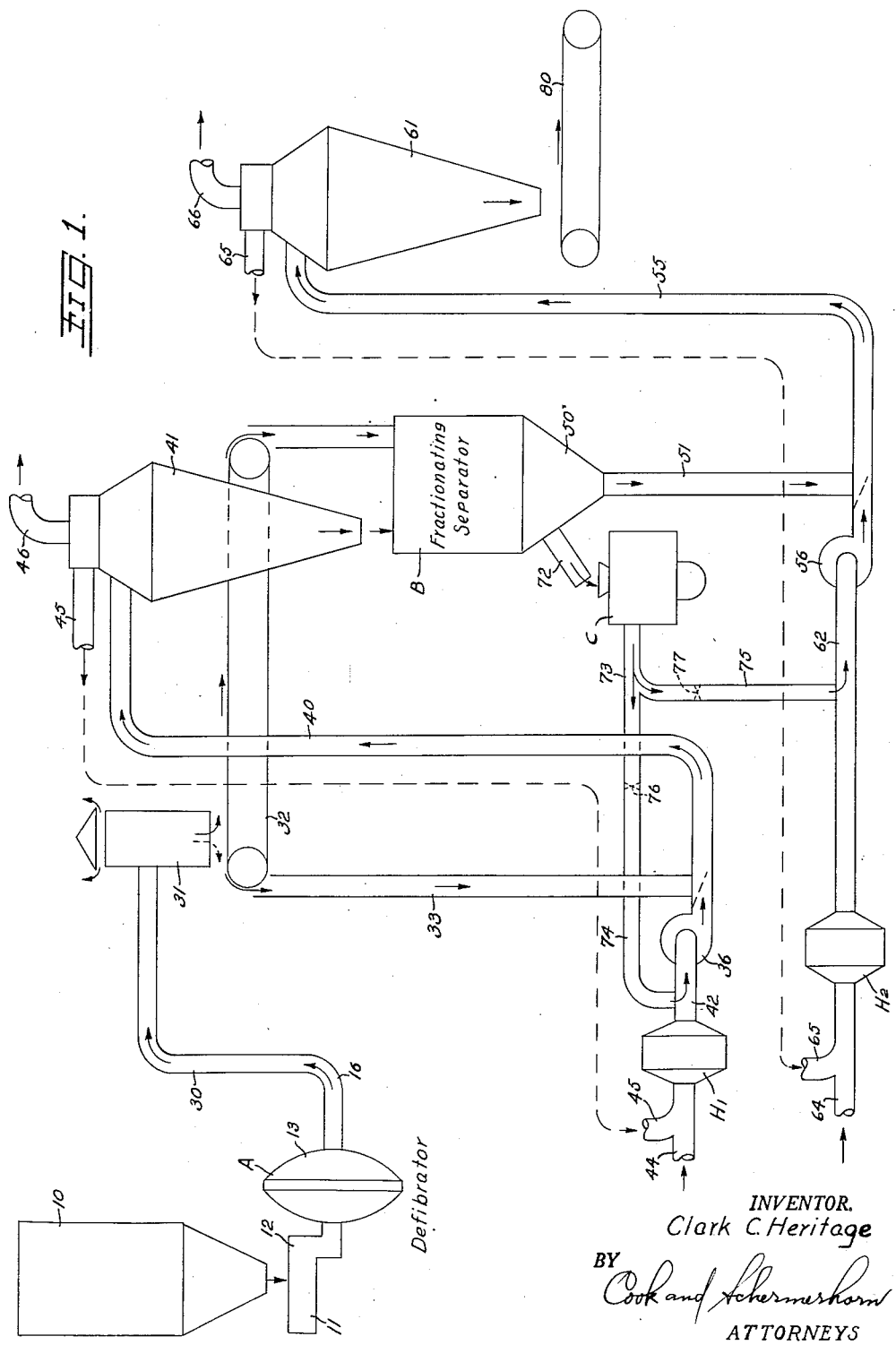

INVENTOR.
Clark C. Heritage
BY
Cook and Schermerhorn
ATTORNEYS

Feb. 21, 1961 C. C. HERITAGE 2,972,171
PRODUCTION OF WOOD FIBER
Filed Oct. 4, 1952 4 Sheets-Sheet 4

INVENTOR.
Clark C. Heritage
BY
Cook and Schermerhorn
ATTORNEYS

United States Patent Office 2,972,171
Patented Feb. 21, 1961

2,972,171

PRODUCTION OF WOOD FIBER

Clark C. Heritage, Tacoma, Wash., assignor, by direct and mesne assignments, of one-half to Weyerhaeuser Company, a corporation of Washington, and one-half to Wood Conversion Company, St. Paul, Minn., a corporation of Delaware Filed Oct. 4, 1952, Ser. No. 313,098

9 Claims. (Cl. 19—72)

This invention relates to the manufacture of wood fiber and has particular reference to the fractionation, in the absence of suspending water, of wood fiber exhibiting a broad particle size distribution, into new and useful bulk fiber products.

Wood fiber for different purposes is produced in many different ways. The various processes may be classified in a general way as wet processes, dry processes, and moist processes. The wet processes may employ attrition mills, but in general they are characterized by a cooking stage in which chemical action usually plays an important part. Such a cooking stage usually employs a batch type process, as distinguished from a continuous production process, in which the source material for the fiber is submerged in an aqueous solution of the reagents. This type of process is generally employed by the paper industry and the product is referred to as pulp. The purpose of the cooking stage is to remove non-cellulosic materials from the wood and free the fiber thereby. When a so-called chemical pulp is produced, substantially all the lignin is removed; when a so-called semi-chemical pulp is produced, only a portion of the lignin is removed. Sulfate and sulfite pulps are examples of chemical pulps.

Fractionation of wet process fiber is accomplished by the use of flat or centrifugal screens at very low consistency, usually followed by thickening of the aqueous suspension. This type of process produces a high quality, uniform ultimate fiber, but it has many disadvantages for certain purposes, among which are the loss of valuable solubles from the fiber, high capital cost of the plant, and high operating cost. An additional disadvantage for some purposes is the water logged condition of the fiber.

The present invention may be applied to a wet process fiber by predrying the fiber, but the invention has its greatest utility and advantage in connection with the use of fiber which has never been suspended in water.

The dry processes are identified primarily with wood flour as manufactured for certain special purposes and sander flour which is produced as a by-product in plywood mills and the like. These processes involve a harsh dry abrasive action which does not produce an acceptable whole product where fibrous characteristics are desired. The individual particles include a considerable portion of minute chunks of wood in addition to a useful fiber content. The present invention provides a means of separating such useful fiber content from the less desirable particles.

The third type of process, illustrated and described in detail herein, is the so-called moist process. It is recognized in the art that useful fiber cannot be made from green chips by attrition without some treatment of the chips such as aqueous soaking with or without chemicals, steaming, or both. The moist processes include such a step as a pretreatment stage in a continuous process which is of short duration in comparison with the cooking time required in the batch type wet processes.

The source material for wood fiber by the moist process may vary in size from chips to sawdust and may be green or dry, although dry wood is not ordinarily employed in commercial production.

In a moist process the pretreatment and attrition stages may be combined in one continuous pressure machine. Examples are the Asplund defibrator with or without an extended preheater, the Beveridge-Kehoe Chemi-pulper used with the Asplund machine in place of the Asplund preheater, and the Messing Durkee digester in combination with an Asplund defibrator in place of the Asplund preheater. The Asplund process and apparatus are disclosed in the Asplund Patents No. 2,008,892 and No. 2,145,851. The Beveridge-Kehoe apparatus is disclosed in the Beveridge and Kehoe Patent No. 2,323,194. An extended preheater for the Asplund defibrator is disclosed in the Lowgren et al. Patent No. 2,396,587.

The two steps of the moist process may also be carried out in separate apparatus where the pretreatment stage is separated from the attrition stage so that the attrition machine may be operated at atmospheric pressure. In such cases, the pretreatment stage may utilize various equipment which is well known in the art, such as the Plywood Research Foundation Steamer, the Beveridge-Kehoe Chemi-pulper, the Messing and Durkee digester, or it can comprise merely a simple preimpregnation treatment. Source material from any of the foregoing pretreatment devices may be defibered in such atmospheric pressure attrition devices as the Bauer machine, the Sprout-Waldron machine, the Prater machine, which is an impact machine of the hammer mill type, or the Allis-Chalmers interplane grinder. The latter is illustrated in the Marsh Patent No. 1,762,122.

There is a commercial demand for large quantities of fiber of high quality at low cost. As was hereinabove pointed out, the quality of a dry process whole product such as wood flour and sander dust is not acceptable where some reasonable fiber length and felting properties are desired. The wet process fiber may be produced to any desired standard in regard to particle size, but some or all of the water solubles are lost in the processing. Also, the wet process is too costly for many uses where it is in competition with conventional less expensive materials, by virtue of the procurement, handling and disposal of huge quantities of water.

The moist processes, therefore, offer attractive promise of a low cost high quality fiber in sufficient quantity to satisfy the demand. The process is continuous and the capital and operating costs are moderate, a small plant being capable of relatively large output. Further, some of the moist processes may be controlled to prevent loss of the valuable water soluble content of the wood. These solubles are principally the products of hydrolysis of the most easily hydrolyzed portions of the wood and the water soluble organic bodies possess useful thermoplastic and bonding properties. Fiber containing these solubles is hereinafter referred to as "whole wood" fiber.

The chief objection to the moist processes as conventionally practiced is the wide range of particle size distribution. The particles may vary in size from broken individual fibers to rather large fiber bundles, sticks and ribbons approaching the coarseness of fine excelsior. There is need in the industry for a higher quality and more uniform fiber of the moist process type in an intermediate range of coarseness having a limited amount of fines and no large fiber bundles, sticks or ribbons.

Analysis of Asplund fiber reveals that it consists of: (a) partially attrited chips which are called sticks, ribbons or bundles, depending upon their massive shapes, (b) small bundles of fibers having a general needle shape and presenting fiber ends, (c) individual tracheids, (d) broken or shortened single tracheids, and (e) broken bundles. The word "fines" as used in the preceding paragraph, referring to size only, could mean small tracheids, broken larger tracheids, or broken short fiber bundles of the nature of fine sawdust. The tracheids in Douglas fir are of various sizes, averaging about ⅛ inch in length and 0.002 inch in diameter but varying widely depending upon age and position in the tree.

Many large volume uses to which moist process fiber are put require particle sizes ranging from those sizes resembling pulp to those sizes comprising slender flexible bundles of tracheids which behave in substantially the same manner as individual tracheids. Such a desirable fraction will then contain only a limited amount of broken or shortened single tracheids and broken bundles, and no partially attrited chips or fiber bundles exceeding a certain predetermined size. Heretofore, high quality fiber having these desirable physical characteristics has been obtainable only by the expensive wet processes practiced by the paper industry and has not been obtainable by the convenient and less expensive moist processes. Fiber having the desired physical characteristics in combination with the useful soluble content of the wood from which it was derived has not been obtainable.

Objects of the present invention are, therefore, to provide an improved high quality whole wood fiber, to provide a moist process fiber of controlled particle size distribution, to provide a stick free moist process fiber, to provide an improved process for refining lignocellulose fiber, to provide an improved process for controlling the particle size distribution of fiber, to provide a process for producing a plurality of fiber products having different predetermined particle size distributions, to provide a novel fiber fractionation process, and to provide apparatus for carrying out the process and producing the products of the invention.

The principles of the invention may be applied to the treatment of the different source materials hereinabove mentioned for effecting the dry fractionation of the whole source material to yield one or more new and useful products and particularly a product having a desirable particle size and fiber characteristics as described in detail hereinafter. When the source material is produced by a dry process, such as wood flour and sander dust, it does not contain particles large enough to be classed as sticks, ribbons or large fiber bundles, and the most valuable fraction comprises the coarse material. In such case the fractionation step is controlled to separate the particles having individual fiber characteristics from the very fine dust in which the particles do not exhibit fiber characteristics.

When the source material is produced by a moist process the fractionation is controlled to reject the coarse material, the desired fiber characteristics being found then in the finer particles. Such fractionation can be made particularly effective by controlling the defibering apparatus to minimize the very fine particles which lack fiber characteristics.

The invention is hereinafter described in greater detail with reference to an Asplund type defibrator as illustrative of a moist process for the production of lignocellulose fiber. In the process and apparatus of the Asplund patents, wood chips are introduced into a high pressure so-called inert gaseous environment providing a temperature above 212° F. at which the lignin content of the wood is softened to permit ready defibration by mechanical means. The chips quickly soften and are fed to a rotary defibering disc mechanism housed in said environment which mechanically rubs the softened chips to effect the defibering thereof. As stated hereinabove, the desired fiber fraction is accompanied by a certain amount of less desirable fine and coarse material. Under optimum conditions of feed rate, condition of the discs, disc adjustment, temperature, pressure, etc., for a particular wood, a fairly good quality of fiber is produced for certain rough uses, but as the discs wear down and the disc adjustment becomes less exact, and taking into consideration possible fluctuations in the feed rate and other variables of the machine, the quality of the fiber in practice is usually considerably below the desired standard, especially in regard to the inclusion of coarse material. Another factor affecting the quality in production also involves the feed rate, even though feed is maintained fairly constant. The fiber tends to be of a higher and more uniform quality, that is, with fewer large fiber bundles, sticks and ribbons at an uneconomically low feed rate. The present invention provides for fractionation of the defibrator output so that the feed rate may be raised to an economical production level without sacrificing the quality of the ultimate product. In other words, with fractionation there is an optimum equilibrium condition which yields a higher output of usable fiber.

The defiberated wood is discharged from the Asplund machine through the reciprocating valve arrangement disclosed in the Asplund patents. The pretreatment and defibering stages may take place in from 0.5 to 30 minutes, depending upon the duration of the pretreatment stage and the equipment provided to carry it out.

An advantage of the Asplund type defibrator is the gaseous environment, preferably steam, surrounding the wood before, during and after defibration, whereby the material is carried through the process in the absence of suspending liquid. Where water suspensions are employed in preparing the fiber, a substantial fraction of the original wood substance is lost by dissolution in the water. This material comprises one or more substances derived from the original wood such as the simplest forms of lignin, polysaccharides and other organic material. The material so removed has fiber bonding and other desirable properties, and its loss from the fiber requires the use of replacement bonding material for certain purposes such as hot pressed fiber boards and hot pressed molded articles.

Fiber produced by the Asplund type process preserves virtually (some volatiles are lost to the atmosphere) all the water soluble content of the fibers. This includes that of the natural wood and more which is formed in the process of defibering as an incident to the steam environment in the pretreatment and defibering stages as explained in the prior Heritage Patent No. 2,553,412. As explained therein and hereinabove stated, the water soluble content, especially the formed water solubles, contain polysaccharides and lignin. For convenience, fiber containing the natural water soluble content of the wood and the formed water solubles is defined as "whole wood" fiber or product to distinguish it from a wood fiber or product from which some of the natural or formed water solubles have been removed.

One of the characteristics of the Asplund machine is that it discharges moist fiber in a loose, substantially unfelted condition which may be easily and directly dried. The steam pressure at discharge from the machine may be used to convey the fiber in a conduit for drying action without subjecting it to conditions which would destroy its substantially unfelted form. Avoidance of wetting the fiber to the point of matting and avoidance of suspending it in water are both economically important for the additional reason that wetting produces clotting, which requires unfelting with possible injury or breaking of the fibers. Wetting of the fiber also exhibits other effects which change the physical properties of the fiber, such as the felting and elastic characteristics, thermal conductivity, free footage or density, etc. In summary, for the purpose of the present invention it is desirable, therefore, that the fiber be formed and handled in the absence of suspending or clotting water, and that it be dried directly from its original loose and fluffed condition.

In the drawings:

Figure 1 is a schematic diagram of a preferred plant organization for carrying out the process of the invention wherein the fractionation step is effected in a rotary air separator;

Figure 2 illustrates an arrangement of two mechanical fractionating separators in series;

Figure 3 illustrates a winnowing chamber for dry fractionation;

Figure 5:
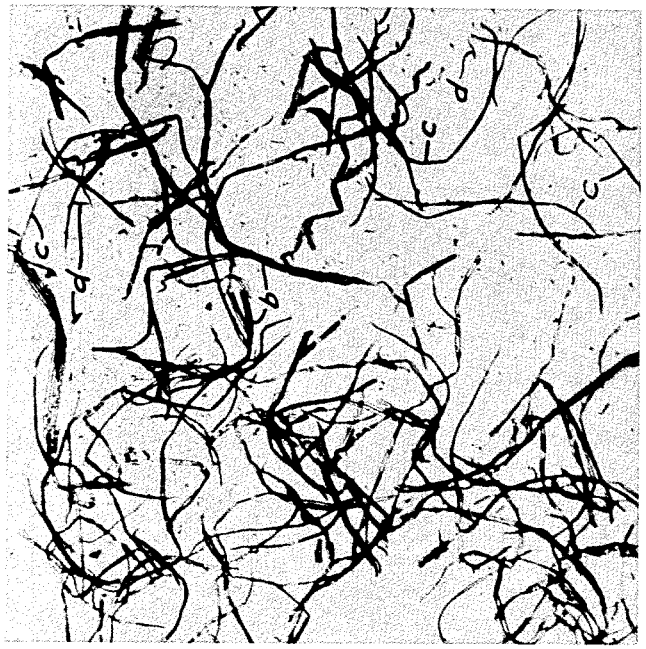
Figure 5 is a photomicrograph showing a fine fraction of Asplund Douglas fir fiber.

Referring now to Figure 1, the lignocellulose source material such as wood chips is delivered to a chip bin 10 in a moist state. By this is meant a state characterized by the absence of free water surrounding the chips. No effort is made to dry the chips; they preferably have the moisture content of the source material which is ordinarily green mill ends and other sawmill leftovers free of bark. Such material usually has a moisture content suitable for defibering in the Asplund type machine. If the source material contains more than the amount of moisture to saturate the fibers, the excess moisture will be squeezed out in the compression or plug forming section of the Asplund machine, and, if it is drier than fiber saturation, the moisture content is increased by the introduction of water in addition to the steam which is used in any event. The addition of water is restricted to an amount sufficient to aid in the satisfactory defibering of the source material but insufficient to produce a continuous solubilizing phase.

The Asplund type defibrating machine, indicated generally at A, comprises a plug forming or compression chamber 11, a receiver 12, a defibering disc housing 13, and a discharge connection 16. In the operation of the machine, chips are forced into the plug forming section 11 under great pressure and are compacted together to form a plug capable of holding a substantial steam pressure in the receiver 12 and housing 13. Steam is introduced through steam pipe connections, not shown, at a rate sufficient to maintain the desired steam pressure while steam and fiber are being discharged continuously at high velocity through the discharge connection 16.

The steam escaping from the discharge connection 16 carries the fiber through a duct 30 to a steam separator 31, from whence the steam escapes to atmosphere, and the fiber drops onto a reversible conveyor belt 32 (see U.S. Patent to Heritage, No. 2,405,213). When the conveyor belt travels to the left it discharges the fiber into a chute 33 communicating with a duct 40 through which heated air is propelled by a blower 36. Duct 40 constitutes a first drying stage in which the fiber is air borne to a cyclone separator 41.

The intake side of the blower 36 is connected through pipe 42 to a first stage heater H¹ having steam pipes to heat the air passing therethrough. Heater H¹ is supplied in part by a fresh air supply pipe 44 and in part by a recirculating air pipe 45. Pipe 45 connects with the air discharge section of cyclone separator 41 whereby a portion of the air from cyclone 41 returns through pipe 45 to heater H¹ and blower 36 for recirculation and a part is discharged to atmosphere through outlet 46. Thus the inlet 44 constitutes a fresh air makeup to compensate for the loss at 46.

Duct 40 is of sufficient length, taking into consideration the air velocity, heat transfer rate of heater H¹, and other variables, to dry the fiber to a desired moisture content in preparation for the next step of the process. The moisture thus removed from the fiber escapes to atmosphere along with the air lost at 46, this quantity of humid air being constantly replaced by a similar quantity of relatively dry air at 44 at ambient temperature and humidity. The partial drying of the fiber in duct 40 prior to fractionation is a desirable expedient to facilitate fractionation, but is not necessary to the invention.

Cyclone separator 41 discharges the fiber into a mechanical fractionating separator B. This separator is of the general type disclosed in the Crites patent, Re. 20,543, issued November 2, 1937. The defibrator fiber delivered to the separator contains a minor quantity of sticks and fiber bundles, in addition to the ultimate wood fiber which is desired in a relatively pure state for many uses. The reversible belt 32 may be driven to the right to deposit the fiber from steam separator 31 directly into the separator B, by-passing the first stage drying duct 40, but the moisture content of the fiber is usually such that if it is given a partial drying treatment through the first stage drying duct 40 the separator B will operate at a higher feed rate and effect a better separation of coarse and fine fractions. The desired fine fraction is deposited in an outer cone 50 having a chute 51 leading to a second drying stage 55. Drying duct 55 is supplied with hot air from a blower 56 to convey the fiber in the air borne passage to a cyclone separator 61. The inlet of blower 56 is connected through a pipe 62 to a second stage heater H². Heater H² is supplied with air in part through a fresh air inlet 64 and in part from a pipe 65 connecting with the air discharge section of cyclone 61. Cyclone 61 thus recirculates a portion of its air through pipe 65 and vents another portion to atmosphere through outlet 66. Inlet 64 constitutes a fresh air makeup to supply the loss through outlet 66 whereby the moisture removed from the fiber in the second drying stage is eliminated from the system.

The separator B subjects its feed material while suspended in air to the combined influences of gravity, centrifugal force, air currents, and mechanical impacting to separate or classify the material into two distinct fractions on a coarseness basis. Means of adjustment are provided in the mechanism to control the ratio of the two fractions so as to produce a fine fraction comprising ultimate fiber and slender flexible fiber bundles, and a coarse fraction comprising sticks, ribbons and fiber bundles which exceed a predetermined particle size. The fine fraction has a soft, wooly texture, the coarse fraction, which has a rough texture and shredded appearance, drops into an inner cone, not shown, having a discharge chute 72.

In accordance with the principles of the invention, the coarse material discharged from chute 72 is subjected to a secondary refinement treatment to reduce it substantially to ultimate fiber similar to that collected by the outer cone 50. The apparatus for accomplishing this additional treatment may be any type which rubs the moist coarse particles apart with the minimum of breakage, as for example, disc attrition mills, ring-roll mills or Mullers. Also, the secondary refinement may be effected by returning the coarse material to the original defibrator. One device found to be advantageous comprises an interplane refiner C of the type disclosed in the U.S. patent to Marsh, No. 1,762,122, issued June 3, 1930. In the interplane refiner the coarse material from chute 72 is introduced between a pair of horizontal companion stationary and revolving attrition discs wherein the refined material is discharged from the peripheries of the discs into an annular housing having an outlet pipe 73. The spacing of the grinding discs is adjustable to produce the desired degree of defibering. Outlet pipe 73 branches into a duct 74 communicating with the suction pipe 42 for the blower 36 and a duct 75 communicating with the suction pipe 62 of blower 56. Duct 74 may be closed by a blast gate 76, and duct 75 may be closed by a blast gate 77. When the gate 76 is closed and gate 77 is opened, the fan suction in pipe 62 will draw the fiber discharged from refiner C through the ducts 73, 75 and 62 and discharge it through the second stage drying duct 55 to cyclone separator 61 along with the fine fraction introduced from chute 51.

When still further separation and refinement are necessary, gate 77 is closed and gate 76 is opened. Then the suction of blower 36 draws the output of refiner C through ducts 73, 74 and 42 and discharges it through the first stage drying duct 40 along with fresh fiber from chute 33 to cyclone separator 41. The material may thus be recirculated through the separator B and any remaining coarse fraction defibered by the refiner C. Or the refined coarse portion may have its own separator.

The product conveyed to cyclone separator 61 is deposited on conveyor belt 80 for final disposition. Final disposition may involve merely packaging for shipment or conversion of the fiber to other products.

As illustrative of the functions performed by the first and second drying stages comprising the ducts 40 and 55 and their associated blowers and heater, the defibrator fiber may enter duct 40 from the steam separator 31 at a moisture content in the neighborhood of 50% total weight basis. It is found that the defibrator A does not operate satisfactorily when the moisture content of the product discharged from the steam separator 31 falls below 40% total weight basas. On the other hand, the mechanical fractionating separator B operates more efficiently at a moisture content below 40% total weight basis. These inconsistent requirements are satisfied by a sufficient margin in the present system by the moisture content adjustment effected by the first drying stage. The first stage drying duct 40, including the drying action of the cyclone separator 41, preferably reduces the 50% moisture content of the defibrator fiber to approximately 30%. Before disposition of the final product, it is desirable for many uses of the fiber to remove most of the remaining moisture in the second drying stage, comprising drying duct 55 and cyclone 61, to leave the product with a final moisture content of about 5–10%. The foregoing values are merely illustrative, and it will be apparent to persons skilled in the art that the present system allows for ample adjustment of the drying action in both the first and second drying stages to hold the moisture contents to the optimum values for a particular source material and taking into consideration the nature of the additive, if any, introduced at the defibrator and the intended use of the fiber.

The photomicrographs in Figures 4–7 are reproduced to a uniform magnification of twenty diameters on the original Bristol board drawings of the patent application whereby the magnification is reduced to about thirteen diameters in the printed patent. The specimens are typical but because of the small amount of material included in the field of view they do not illustrate the true relative amounts of the different particle sizes on a quantitative basis, nor do they necessarily include the extreme maximum particle size which may be present only in insignificant amounts in each class of material.

Figure 4:
Figure 4 is a photomicrograph of Asplund Douglas fir fiber.

Figure 4 is a photomicrograph of Asplund Douglas fir fiber obtained from the defibrator A in Figure 1. The material included in the specimen of the photograph will be observed to contain relatively rigid and massive sticks $a$, slender flexible bundles of fibers $b$, individual tracheids $c$, broken or shortened single tracheids $d$, and broken fiber bundles $e$.

Figure 5 is a photomicrograph of a fine fraction separated from the Asplund fiber of Figure 4 by dry or moist fractionation. In this specimen it will be observed first that there are no massive and rigid sticks corresponding to $a$ in Figure 4 nor broken bundles of a size and massive form comparable to those indicated at $e$ in Figure 4. The specimen in Figure 5 consists essentially of individual tracheids $c$, broken or shortened single tracheids $d$, and slender flexible bundles of fibers $b$. All of these particles have desirable fiber characteristics for felting and other purposes. This fraction has a uniformly soft and wooly texture which is readily distinguished from the original Asplund fiber shown in Figure 4 by its physical appearance and "feel."

Figure 6:
Figure 6 is a photomicrograph of a coarse fraction of Asplund Douglas fir fiber.

Figure 6 is a photomicrograph of a coarse fraction separated from the Asplund fiber of Figure 5 by dry fractionation. The specimen displays all the different particle classifications enumerated in Figure 4, but in a larger sample they are found to be present in quite different proportions on a quantitative basis. The material in Figure 6 is quite distinct from those in both of Figures 4 and 5, as the sticks $a$ predominate over all the other particle types and sizes, giving the material a rough appearance and texture quite comparable to conventional excelsior. The finer material appearing in Figure 6 is not present in significant amounts in larger samples. This coarse fraction distinctly does not have fiber characteristics suitable for felting and like purposes. The predominating particles are thick and stiff and comprise mostly sticks, ribbons and relatively massive bundles, as designated at $e$.

Figure 7:
Figure 7 is a photomicrograph of kraft pulp used by the paper industry.

Figure 7 is a photomicrograph of typical kraft pulp. This specimen is characterized by the absence of sticks $a$ and broken bundles $e$. The material consists almost entirely of individual tracheids $c$ and broken or shortened single tracheids $d$, with a small proportion of apparently slender flexible bundles of fibers $b$ consisting of a small number of individual tracheids. The slenderness and flexibility of practically all the particles imparts the typical fiber characteristic which is extensively utilized in the making of paper and for other purposes requiring uniform fiber characteristics in the particles. This material affords a fair illustration of the goal of the present process in regard to the physical characteristics of the particles. As hereinabove pointed out, however, kraft pulp and the other paper industry fibers are relatively expensive to make and are deficient chemically for applicant's purpose because they do not contain the lignins and desirable soluble materials of the original wood structure. Such chemical deficiencies, of course, are not revealed in the photomicrograph.

A comparison of Figures 5 and 7 reveals that the fine fraction approximates the quality of fiber in kraft pulp in regard to particle size and fiber characteristics through the elimination of the undesirable coarse material illustrated in Figure 6. Thus, on a physical basis, the present product illustrated in Figure 5 is comparable and almost equal to kraft pulp. On a chemical basis, the product of Figure 5 is superior to kraft pulp by reasons of the inclusion of the lignins and water soluble materials of the original wood having thermoplastic and other desirable properties which are utilized to advantage in the processing of the fiber product for different purposes. Thus the present product, illustrated in Figure 5, is superior not only to its own source material, which was in this case Asplund fiber, but is also superior for many purposes to the paper industry pulp to which it bears a close physical resemblance.

Figure 2 illustrates an arrangement of two fractionating separators in series to fractionate the source material in two steps for obtaining a finer separation of the desired fraction. The source material S, which may be Asplund fiber or any other material containing a desirable fiber fraction, either untreated or treated with suitable additives, is introduced into the first separator $B_1$. This separator is of the type illustrated at B in Figure 1 which is capable of dividing the source material into two fractions on a coarseness basis, the products in Figure 2 being a first coarse product $C_1$ and a first fine product $F_1$. The separator $B_1$ is adjusted in accordance with its capacity and the feed rate of source material delivered to it to effect a clean separation of the very coarse material $C_1$ with a negligible amount of the desirable fiber fraction included in the product $C_1$. Such adjustment usually results in more or less coarse material being included in the fine product $F_1$.

It is apparent that in a single step fractionation process a different adjustment of the separator must be made in order to keep the fraction $F_1$ containing the desired fiber product as free as possible of coarse material. There is necessarily then a considerable loss of the desired product along with the rejected coarse fraction $C_1$, especially when the separator is operated at a commercially economical feed rate. Thus, the single step fractionation process might waste a considerable amount of the desirable fiber, or, conversely, in order to avoid such waste of the desirable fiber, the fractionator might have to be operated at such a low feed rate as to be uneconomical and impractical. When this situation arises, the two-step fractionation process illustrated in Figure 2 facilitates a cleaner separation with less waste of the desirable fiber product, while, at the same time, maintaining a satisfactory feed rate for steady economical commercial production.

Thus, in Figure 2, the first separator $B_1$ may be considered as a "rougher" whose fine product, $F_1$, still containing a portion of the coarse fraction, is delivered as the source material to a second separator $B_2$. Because of its lower feed rate, the second separator $B_2$ may be adjusted more critically to effect a clean separation of the two products comprising its fractions $F_2$ and $C_2$ without objectionable loss of the desirable fiber product in the rejected coarse material $C_2$. In this arrangement, the separator $B_2$ can be adjusted to exclude all the remaining sticks, ribbons and thick fiber bundles, and discharge in its product $F_2$ only the ultimate fibers and slender flexible fiber bundles having the characteristics of ultimate fibers. In some cases this can be accomplished using a smaller machine at $B_2$ which increases the yield and quality of the product over the single step process sufficiently to more than offset the additional cost and operating expense of the second fractionator.

The series arrangement of Figure 2 can also be employed to produce an intermediate fraction substantially free of coarse bundles and also free of fine broken fragments. In this case, the first separator $B_1$, instead of functioning as a "rougher," is adjusted to remove all the coarse material at $C_1$, leaving the desired intermediate fraction and the undesired fines to be discharged together in the product $F_1$. The second separator $B_2$ is then adjusted to discharge the desired fiber product as a coarse fraction at $C_2$, eliminating the dust and fine broken fragments as a reject fraction at $F_2$.

The particle size distribution of the source material will largely determine whether a one-step fractionation process is sufficient, or whether one of the two different two-step processes just described will give sufficiently better results to justify the additional installation. Of course, to obviate the second separator $B_2$, it is possible to feed the product $F_1$ through the separator $B_1$ a second time, making an appropriate change in the adjustment of the separator for the reworking and temporarily shutting off of the flow of new source material. It is also possible to recirculate the product $F_1$ through $B_1$ along with the steady flow of new material.

The arrangement shown in Figure 2, however, has the advantage that the two separators may be individually adjusted to produce the cleanest separation for the purpose desired, taking into consideration the different feed rates and the different ranges of particle size distribution in the two separators, the process being continuous and uninterrupted and requiring substantially no further adjustment after satisfactory steady operating conditions have once been established for a particular source material and feed rate.

Figure 3 is a longitudinal sectional view of a winnowing chamber which may be employed to separate a loosely fluffed fiber source material, with or without additives, into any desired number of fractions on a coarseness basis in a single operation. The elongated chamber, designated generally at 85, is enclosed by opposite vertical side walls 86 and a horizontal top wall 87. The input end of the chamber is preferably closed by a vertical end wall 88, and the other end 89 may be left open or enclosed and connected with a suitable air discharge duct, as shown. Near the upper end of the input end, the wall 88 is apertured to receive a horizontal feed duct 90. The bottom of the chamber 85 is divided into a plurality of transverse bins at different distances from the feed duct 90. In the present embodiment, these bins comprise the series of transverse conveyor belts 91 to 96, separated by transverse partitions 97. The belts are arranged to remove the fractions separately from one side of the winnowing chamber.

When the source material S is introduced into an air stream from blower 98 in the feed duct 90, the material is blown longitudinally through the chamber 85 towards its open end 89, subject to the influences of gravity and the propelling force of the air stream. The chamber 85 has a much greater cross sectional area than the feed duct 90, and so the velocity through the chamber is insufficient to carry the solid material indefinitely in air suspension, whereby the particles describe trajectories from the input duct 90 to the different bins in the bottom of the chamber, as indicated by the falling material 99. The air velocity may be adjusted to produce the trajectory pattern illustrated by controlling the speed of blower fan 98 or by the use of suitable dampers, not shown. The largest and heaviest particles, comprising the sticks and coarse fiber bundles, fall in the steepest trajectories into the first bin 91, whereas the dust and fine broken fragments fall in the flattest trajectories, extending possibly even to the last bin 96. Particles of intermediate coarseness fall in the intervening bins 92 to 95, whereby any number of fractions may be obtained by dividing the length of the chamber into a greater or lesser number of bins.

The different types of apparatus hereinabove described serve to illustrate a variety of means for carrying out the process of the invention to obtain new and useful fiber products as set out in the objects of the invention. The invention is not limited to these specific types of apparatus, however, but also includes such other devices and arrangements as may fall within the scope of the appended claims.

Having now described my invention and in what manner the same may be used, what I claim as new and desire to protect by Letters Patent is:

1. The method of continuously moving defibered wood chips from a source of supply of same as a stream of fibers in a gaseous vehicle comprising steam, said stream of fibers containing a quantity of coarse particles and bundles of fibers of wood in admixture with individualized ultimate fibers of wood, continuously separating said stream of fibers from the vehicular steam, re-forming the stream of fibers, subjecting the fibers in a loosely fluffed condition to the influences of gravity and a moving current of air in an environment allowing freedom of movement of the fibers in flow paths in different directions responsive to said influences in accordance with the coarseness of the particles, collecting in one of said flow paths a relatively coarse fraction comprising sticks and relatively massive fiber bundles, and collecting in another of said flow paths a relatively fine fraction comprising individualized ultimate fibers and slender flexible bundles of ultimate fibers, and continuously conveying the particles of both fractions in moving gaseous vehicle streams for further processing to produce a product consisting essentially of individualized ultimate fibers.

2. The method of continuously moving defibered wood chips from a source of supply of same as a stream of wood fibers in an entraining gaseous vehicle comprising steam, said stream of fibers containing a quantity of coarse particles and bundles of fibers of wood in admixture with individualized ultimate fibers of wood, continuously separating and removing steam from the stream of fibers, reforming the stream of fibers, continuously propelling heated air into the moving stream of wood fibers, separating and removing spent heated air from the moving stream of wood fibers and entraining gaseous vehicle, continuously fractionating and dividing the stream of fibers into a stream of said coarse particles and bundles of fibers and a stream of said individualized ultimate fibers, continuously conveying the said separated coarse particles and bundles of fibers in a moving gaseous vehicle stream for further processing, and continuously conveying the separated individualized ultimate fibers in a moving gaseous vehicle stream to produce a product consisting essentially of individualized ultimate fibers.

3. The method of claim 2 in which a portion of the separated spent heated air is recycled.

4. The method of continuously moving defibered wood chips from a source of supply of same as a stream of wood fibers in an entraining gaseous vehicle comprising steam, said stream of fibers containing a quantity of coarse particles and bundles of fibers of wood in admixture with individualized ultimate fibers of wood, continuously separating and removing steam from the stream of fibers, continuously propelling heated air into the moving stream of wood fibers, continuously fractionating and dividing the stream of fibers by subjecting the same to the combined influences of gravity, centrifugal force, and air currents, into a stream of coarse particles and bundles of fibers and a stream of said individualized ultimate fibers, conveying the said separated coarse particles and bundles of fibers in a moving gaseous vehicle stream for further processing, and continuously conveying the stream of individualized ultimate fibers in a moving gaseous vehicle stream to produce a product consisting essentially of individualized ultimate fibers.

5. The method of claim 4 in which the moving gaseous vehicle stream conveying the stream of individualized ultimate fibers is a moving stream of heated air.

6. The method of claim 4 in which additional heated air is continuously propelled into the stream of individualized ultimate fibers obtained after fractionation.

7. The method of claim 6 in which spent heated air is separated and removed from the moving gaseous vehicle stream and the fractionated individualized ultimate fibers and a portion of said separated spent heated air is recycled.

8. The method of claim 4 in which spent heated air is separated and removed from the moving stream of entraining gaseous vehicle and wood fibers just prior to the fractionation and dividing step.

9. The method of claim 8 in which a portion of the separated spent heated air is recycled.

References Cited in the file of this patent

UNITED STATES PATENTS

| | | |
|---|---|---|
| Re. 20,543 | Crites | Nov. 2, 1937 |
| 1,574,384 | Garner | Feb. 23, 1926 |
| 1,577,545 | Soderlund et al. | Mar. 23, 1926 |
| 1,897,620 | Respess | Feb. 14, 1933 |
| 2,090,955 | Taylor | Aug. 24, 1937 |
| 2,325,055 | Heritage | July 27, 1943 |
| 2,405,213 | Heritage | Aug. 6, 1946 |
| 2,420,036 | Fairbairn | May 6, 1947 |
| 2,454,534 | Walter | Nov. 23, 1948 |
| 2,540,348 | Reed | Feb. 6, 1951 |
| 2,553,412 | Heritage | May 15, 1951 |
| 2,626,864 | Miscall | Jan. 27, 1953 |